3,577,381
HEAT STABILIZATION OF POLYESTER RESIN
WITH PHENYLPHOSPHINIC ACIDS
Mary J. Stewart, Riddlewood, Media, and John A. Price, Swarthmore, Pa., assignors to FMC Corporation, Philadelphia, Pa.
No Drawing. Filed Apr. 25, 1968, Ser. No. 724,280
Int. Cl. C08g 51/58
U.S. Cl. 260—45.7
9 Claims

ABSTRACT OF THE DISCLOSURE

A composition including a high molecular weight, thermoplastic linear polyester resin and a heat stabilizing amount of diphenyl phosphinic acid or phenyl phosphinic acid, is disclosed herein.

Filament-forming thermoplastic polyester and copolyester resins are generally formed into shaped articles by extrusion of the molten polymer under pressure through a shaped orifice or into a mold. When these resins are exposed to these extusion conditions, they are subject to thermal degradation whereby lower molecular weight polymers having less desirable physical properties and color are obtained. Furthermore, in the processing of polyester filaments and films, the resinous articles are often subjected to elevated temperatures to accomplish orientation and annealing. This treatment also tends to produce thermal degradation of the polymer.

Therefore, it is an object of this invention to provide a heat stabilized filament- and film-forming thermoplastic polyester resin composition.

This and other objects are accomplished in accordance with this invention which comprises a mixture of a filament- and film-forming thermoplastic polyester resin and a heat stabilizing amount of mono- or diphenyl phosphinic acid.

While filament-forming polyalkylene terephthalate and terephthalate copolyester resins are the preferred resins for this invention, based on their commercial importance, other homo- and copolyester resins are also included. Examples of filament-foming resins useful for this invention include those which can be derived from dicarboxylic acids and diols, e.g. a phthalic acid and an alkylene glycol having from 2 to 10 carbon atoms. In general, the diacids include aliphatic dicarboxylic acids, particularly adipic acid and higher homologues, and aromatic dicarboxylic acids. including for example, orthophthalic acid, isophthalic acid, terephthalic acid, bibenzoic acid and the naphthalic acids. Examples of diols include aliphatic, cycloaliphatic and aromatic glycols, particularly alkylene glycols, oxyalkylene glycols, xylyene glycols, and bisphenols. Mixtures of diacids, mixtures of the diols, or mixtures of both, are used to prepare copolyester resins, and small proportions of interpolymerizable dye adjuvants for the resins are, at times, also included.

There are various known methods for the preparation of high molecular weight polyester resins. Of these, the two most commonly employed are the so-called transesterification method and the direct esterification method. In the former, an alkanol diester is reacted with a glycol and the product condensed, while in the latter, the diacid is reacted directly with a glycol and the product condensed. In any event, the method of forming the high molecular weight polyester resin of this invention is not critical.

The thermal or heat stabilizers of this invention are phenyl phosphinic acid and diphenyl phosphinic acid. The stabilizer compound is preferably blended with the polyester resin immediately after the polycondensation step has been completed, at atmospheric pressure, while the resin is still molten in order to form a uniform blend of polyester resin and a thermal stabilizer of the present invention.

It has been found that the present thermal stabilizers, as defined above, are effective as such in polyester resin compositions when employed in amounts ranging from about 0.01% to about 0.5%, based on the weight of the linear polyester resin. Usually, it has been found that concentrations ranging from about 0.02% to about 0.3% by weight, are preferred in most instances.

Thermal stability of polyester resin was determined by a procedure and formula based on the values developed in the procedure whereby the percent of broken bonds of the test resin was indicated. The procedure was as follows: A polyester resin composition of known intrinsic viscosity was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. (±0.5° C.). The block was then sealed and evacuated to 0.1 mm. of mercury. After holding for about 10–15 seconds, the block was filled with dried, oxygen-free nitrogen gas. This vacuum-nitrogen purge was then repeated for a total of three times; the entire process took 5–7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and is noted as the degraded intrinsic viscosity.

The relative effectiveness of compounds as thermal stabilizers in polyester compositions can be most accurately expressed on the basis of percentage broken bonds resulting from exposing a given resin composition containing such a stabilizer to elevated temperatures for a given period, rather than from a direct reading of the difference between the original intrinsic viscosity and the degraded intrinsic viscosity as developed in the above procedure. It is known that polyester resins having higher original intrinsic viscosities will generally show a greater drop in intrinsic viscosity when exposed to elevated temperatures than those with lower original intrinsic viscosities, although on a percentage broken bonds basis, the stability of such a resin composition having a higher original intrinsic viscosity might be equivalent to one exhibiting a lesser drop in intrinsic viscosity.

The percentage broken bonds value for polyethylene terephthalate is defined as the bonds broken per mole of ethylene terephthalate repeating unit times 100, and the values given in the examples below are determined by the use of the following equation:

Percent Broken Bonds $$=\left[\left(\frac{K}{V_f}\right)^{1/a}-\left(\frac{K}{V_i}\right)^{1/a}\right]\times 9.6\times 10^3$$

The value of K and $a$ may be found in the literature, such as Conix, A., Makromol., Chemie 26, p. 226 (1958), wherein $K=0.00021$ and $a=0.82$. $V_f$ in the above formula is the degraded or final intrinsic viscosity value and $V_i$ is the original or initial intrinsic viscosity value.

All of the intrinsic viscosity determinations of the polyester resin products produced in the following examples were determined in a 60% phenol-40% tetrachloroethane solution, wt./wt., at 30° C., according to conventional laboratory procedure.

The following examples are set forth to demonstrate this invention:

EXAMPLE I

A blended mixture of 474 grams of terephthalic acid, 288 mls. of ethylene glycol, and 149 mls. of triethylamine was charged into a reaction vessel equipped with a nitrogen inlet, a Dean-Starke separating apparatus, heating means and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 230° C. over a one-hour period to remove all the triethylamine and any excess glycol. The prepolymer product was allowed to cool under an atmosphere of nitrogen. Fifty grams of this prepolymer product was then mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the polyester prepolymer and formation of a polyester resin. The vacuum in the reactor was released by admitting nitrogen gas and 0.02 gram of diphenyl phosphinic acid was added, the molten mixture stirred for between 5 and 10 minutes, and then cooled under nitrogen.

The resin composition had an original intrinsic viscosity of 0.645, and a melting point of 264° C. After subjecting the resin to the above-described procedure for thermal degradation, the degraded intrinsic viscosity was found to be 0.610 and the percent of broken bonds calculated to be 0.038. This result was compared with a control resin prepared under exactly the same conditions, without the incorporation of a stabilizer and subjected to the thermal degradation procedure. The percent of broken bonds for the control was found to be 0.132, indicating a decided improvement in thermal stability for polyester resin containing diphenyl phosphinic acid.

EXAMPLE II

Polyester resin was prepared in precisely the same manner described in Example I, except that instead of diphenyl phosphinic acid, 0.02 gram of phenyl phosphinic acid was added. The calculated percent of broken bonds was 0.050, again indicating a significant improvement for the resin over the control of Example I in thermal stability.

EXAMPLE III

A mixture of 600 grams of dimethyl terephthalate, 396 mls. of ethylene glycol and 0.24 gram of lithium hydride was charged to a reaction vessel equipped with a nitrogen inlet, heating means and stirring means. The reaction mixture was agitated and heated at atmospheric pressure to 198° C. under nitrogen. The reaction mixture was held at about 198° C. for about two hours, during which time by-product methanol was distilled off. The temperature of the reaction was then allowed to rise to 230° C. over a period of about one hour to distill off any remaining methanol and excess glycol. The prepolymer product was then allowed to cool under nitrogen.

Fifty grams of this prepolymer was then mixed with 0.02 gram of antimony trioxide and placed in a reaction vessel. The reaction was heated to about 280° C. under reduced pressure of from 0.05 to 0.1 mm. of mercury with mixing for about 2 hours to bring about polycondensation and resulting formation of a high molecular weight polyester resin. The vacuum in the reactor was released with nitrogen and 0.02 gram of diphenyl phosphinic acid was added, the molten mixture stirred for 5 to 10 minutes, and then cooled under nitrogen.

The resin composition had an original intrinsic viscosity of 0.660 and a melting point of 262° C. After the resin was subjected to the above-described thermal test procedure, it was found to have a degraded intrinsic viscosity of 0.626, and the percent of broken bonds calculated to be 0.037. A control resin prepared under exactly the same conditions, without the addition of a stabilizer and subjected to the thermal degradation procedure, had a percent of broken bonds calculated as 0.094, indicating that the diphenyl phosphinic acid provided a distinct improvement in thermal stability for the resin.

While the monoalkyl and dialkyl phosphinic acids will also be expected to provide improved heat stability for polyester resins, these materials are not as readily available as the phenyl phosphinic acids. On the other hand, certain other substituted phosphinic acids, such as diphenyldithiophosphinic acid, do not provide a distinct improvement in polyester resin thermal stability and also may produce undesirable color and odor in the resin product.

Various changes and modifications may be made practicing the present invention, without departing from the spirit and scope thereof, and therefore, it is not intended to be limited, except as defined in the appended claims.

We claim:
1. A composition comprising a mixture of a filament- or film-forming thermoplastic polyester resin and a heat stabilizing amount of mono- or diphenyl phosphinic acid.
2. The composition of claim 1 wherein the amount of mono- or diphenyl phosphinic acid ranges from about 0.01 to about 0.5%, based on the weight of the polyester resin.
3. The composition of claim 1 wherein the stabilizer employed is diphenyl phosphinic acid.
4. The composition of claim 1 wherein the stabilizer employed is monophenyl phosphinic acid.
5. The composition of claim 1 wherein the polyester resin is a terephthalate resin.
6. The composition of claim 5 wherein the resin is polyethylene terephthalate.
7. The composition of claim 1 in the form of a filament.
8. The composition of claim 1 in the form of a film.
9. The composition of claim 1 in the form of a molded article.

References Cited

UNITED STATES PATENTS

| | | | |
|---|---|---|---|
| 3,489,722 | 1/1970 | Kotani et al. | 260—75 |
| 2,493,597 | 1/1950 | Rothrock, Jr., et al. | 260—45.7 |
| 2,510,777 | 6/1950 | Gray | 260—45.7 |
| 2,553,643 | 5/1951 | Ellerhorst, Jr. | 260—45.7 |
| 3,249,562 | 5/1966 | Schoepfle et al. | 260—2.5 |
| 3,322,716 | 5/1967 | Klein et al. | 260—45.7 |
| 3,385,819 | 5/1968 | Gouinlock, Jr. | 260—45.75 |
| 3,446,763 | 5/1969 | Okuzumi | 260—22 |

DONALD E. CZAJA, Primary Examiner

R. A. WHITE, Assistant Examiner